(12) United States Patent
Egiazarian et al.

(10) Patent No.: US 10,909,660 B2
(45) Date of Patent: Feb. 2, 2021

(54) SYSTEMS AND METHODS FOR EFFICIENT ENHANCED IMAGE FILTERING BY COLLABORATIVE SHARPENING IN SIMILARITY DOMAIN

(71) Applicants: FLIR Systems, Inc., Wilsonville, OR (US); NOISELESS IMAGING OY LTD., Tampere (FI)

(72) Inventors: Karen Egiazarian, Tampere (FI); Lucio Azzari, Tampere (FI); Vladimir Katkovnik, Tampere (FI); Alessandro Foi, Tampere (FI)

(73) Assignee: FLIR Systems, Inc., Wilsonville, OR (US)

( * ) Notice: Subject to any disclaimer, the term of this patent is extended or adjusted under 35 U.S.C. 154(b) by 48 days.

(21) Appl. No.: 16/535,517

(22) Filed: Aug. 8, 2019

(65) Prior Publication Data
US 2019/0362470 A1  Nov. 28, 2019

Related U.S. Application Data

(63) Continuation of application No. PCT/US2018/017885, filed on Feb. 12, 2018.
(Continued)

(51) Int. Cl.
G06T 3/40 (2006.01)
G06T 5/20 (2006.01)
G06T 5/50 (2006.01)

(52) U.S. Cl.
CPC .............. *G06T 3/4084* (2013.01); *G06T 5/20* (2013.01); *G06T 5/50* (2013.01); *G06T 2207/20021* (2013.01)

(58) Field of Classification Search
CPC .......... G06T 3/4084; G06T 5/20; G06T 5/50; G06T 2207/20021
(Continued)

(56) References Cited

U.S. PATENT DOCUMENTS

2006/0245645 A1* 11/2006 Yatziv .................. G06T 11/001
382/167
2014/0015921 A1  1/2014 Foi et al.
(Continued)

OTHER PUBLICATIONS

Hou et al. "Image Denoising by Block-Matching and 1D Filtering"; Fourth International Conference on Machine Vision (ICMV 2011); Proc. of SPIE vol. 8349, No. 1, 6 pages, Bellingham, WA.
(Continued)

*Primary Examiner* — Ayodeji O Ayotunde
(74) *Attorney, Agent, or Firm* — Haynes and Boone, LLP

(57) ABSTRACT

Various techniques are disclosed for reducing noise and enhancing sharpness of an input image. For example, a method includes performing an initial collaborative filtering and sharpening on the input image to generate a pilot image, using the pilot image to derive coefficients that are used to perform a second collaborative filtering on the input image to generate a filtered image. In some embodiments, the collaborative filtering and sharpening is performed using parameters that boost or enhance the differences in pixel values for the same spatial locations of the matched image blocks extracted during the collaborative filtering and sharpening process. Accordingly, the method according to various embodiments performs especially well for images that have weak spatial correlations among mutually similar blocks.

20 Claims, 5 Drawing Sheets

Related U.S. Application Data

(60) Provisional application No. 62/459,495, filed on Feb. 15, 2017.

(58) Field of Classification Search
USPC .......................................................... 382/254
See application file for complete search history.

(56) References Cited

U.S. PATENT DOCUMENTS

| | | | |
|---|---|---|---|
| 2014/0219552 A1* | 8/2014 | Porikli | G06T 5/20 382/155 |
| 2015/0187053 A1 | 7/2015 | Chen et al. | |
| 2015/0254813 A1 | 9/2015 | Foi et al. | |
| 2018/0330473 A1 | 11/2018 | Foi et al. | |
| 2018/0330474 A1 | 11/2018 | Mehta et al. | |
| 2019/0075247 A1* | 3/2019 | Vink | G06T 5/50 |

OTHER PUBLICATIONS

Dabov et al. "Image Denoising by Sparse 3-D Transform-Domain Collaborative Filtering"; IEEE Transactions on Image Processing, Piscataway, NJ, vol. 16, No. 8, pp. 2080-2095, Aug. 1, 2007.

Dabov et al. "Joint Image Sharpening and Denoising by 3D Transform-Domain Collaborative Filtering" Tampere, Finland, 8 pages, Jan. 1, 2007.

Bojana et al. "Contrast Enhancement and Denoising of Poisson and Gaussian Mixture noise for Solar Images"; 2011 $18^{th}$ IEEE International Conference on Image Processing, pp. 185-188; Sep. 11, 2011.

Egiazarian et al. "Adaptive de-noising and lossy compression of images in transform domain" J. Electron, Imaging 8(3), 233-245 Jul. 1, 1999.

Dabov "BM3D image denoising with shape-adaptive principal component analysis" Proceedings of the workshop on Adaptive Spares Structured Representations (SPARS), Saint-Malo, France, Apr. 6, 2009.

* cited by examiner

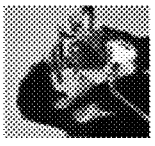
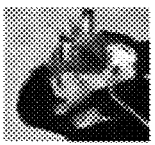
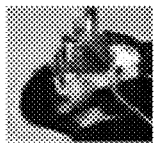
Fig. 2A original
PSNR: inf
SS1M:1
Fig. 2B noisy
14.2 db
0.33
Fig. 2C SDCT
21.8 db
0.512
Fig. 2D BM3D
21.8 db
0.534
Fig. 2E BM1D
21.9 db
0.524
Fig. 2F BM3D1Ds
23.0 db
0.569
Denoising of the fragment of 'cameraman' image using sliding DCT (SDCT), BM3D, BM1D and the proposed BM3D1Ds filters

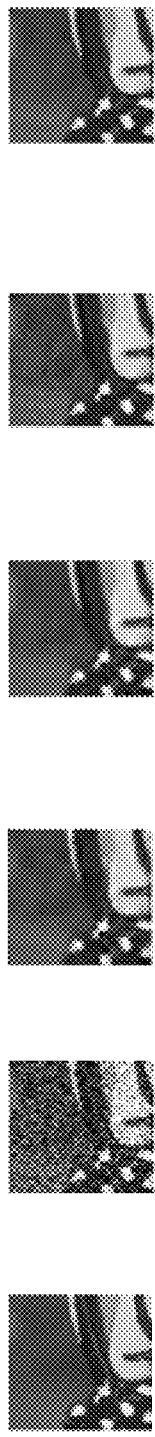
Fig. 3A original PSNR: inf SS1M:1
Fig. 3B noisy 14.2 db 0.33
Fig. 3C SDCT 24.9 db 0.520
Fig. 3D BM3D 25.1 db 0.529
Fig. 3E BM1D 24.2 db 0.465
Fig. 3F BM3D1Ds 26.0 db 0.557
Denoising of the fragment of 'monarch' image using sliding DCT (SDCT), BM3D, BM1D and the proposed BM3D1Ds filters

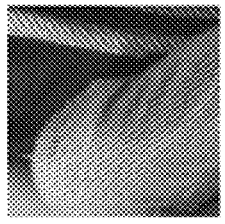
Fig. 4A original
PSNR: inf
SS1M:1
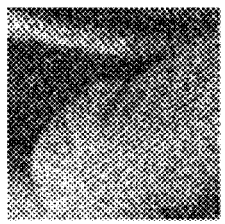
Fig. 4B noisy
14.2 db
0.281
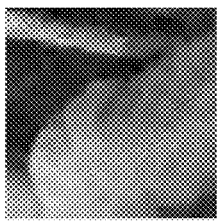
Fig. 4C SDCT
21.5 db
0.315
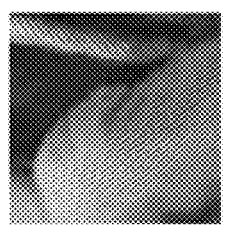
Fig. 4D BM3D
25.1 db
0.601
Fig. 4E BM1D
24.1 db
0.584
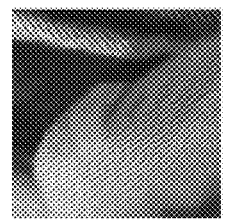
Fig. 4F BM3D1Ds
25.9 db
0.639
Denoising of the fragment of 'Barbara' image using sliding DCT (SDCT), BM3D, BM1D and the proposed BM3D1Ds filters

SYSTEMS AND METHODS FOR EFFICIENT ENHANCED IMAGE FILTERING BY COLLABORATIVE SHARPENING IN SIMILARITY DOMAIN

CROSS REFERENCE TO RELATED APPLICATIONS

This application is a continuation of International Patent Application No. PCT/US2018/017885 filed Feb. 12, 2018 and entitled "SYSTEMS AND METHODS FOR EFFICIENT ENHANCED IMAGE FILTERING BY COLLABORATIVE SHARPENING IN SIMILARITY DOMAIN," which is incorporated herein by reference in its entirety.

International Patent Application No. PCT/US2018/017885 claims priority to and the benefit of U.S. Provisional Patent Application No. 62/459,495 filed Feb. 15, 2017 and entitled "SYSTEMS AND METHODS FOR EFFICIENT ENHANCED IMAGE FILTERING BY COLLABORATIVE SHARPENING IN SIMILARITY DOMAIN" which is hereby incorporated by reference in its entirety.

TECHNICAL FIELD

One or more embodiments of the disclosure relate generally to imaging processing and more particularly, for example, to reduction of noise and enhancement of the sharpness of images.

BACKGROUND

Conventional self-similarity based techniques for noise reduction and resolution enhancement of images work reasonably well when there exist high spatial correlations among mutually similar patches within an image. When there are low spatial correlations among the mutually similar patches within an image, these techniques is often unable to sparsify the data, causing loss of important details when during the process of noise reduction and resolution enhancement.

Thus, there is a need for improved image denoising techniques for producing high resolution and clean images with images having low spatial correlations among mutually similar patches.

SUMMARY

Various techniques are disclosed for reduction of noise and enhancement of sharpness of an image. In one aspect, the various techniques disclosed herein provide cleaner (higher peak signal to noise ratio) and sharper images even when spatial correlations among mutually similar patches within the image is weak. According to some embodiments, an input image is received, the input image is divided into a plurality of input image reference blocks. The input image might include considerably high noise content. An initial filter is applied to the input image to generate a pilot image. The initial filter, in some embodiments, may be implemented as a collaborative filter that includes, constructing a first plurality of three-dimensional (3D) stacks of image blocks by stacking together similar image blocks that are extracted from an input image, applying a one-dimensional (1D) transform to the first plurality of 3D stacks of image blocks along the dimension of the stacking to obtain a corresponding first plurality of transformed 3D stacks where each transformed 3D stack includes 1D transform-domain-coefficients, modifying the 1D transform-domain coefficients of the first plurality of transformed 3D stacks to enhance the differences with respect to the dimensions of the stacking, and generating the pilot image using the first plurality of transformed 3D stacks comprising the modified 1D transform-domain coefficients.

Modifying the 1D transform-domain coefficients of the first plurality of transformed 3D stacks may include shrinking the 1D transform-domain coefficients based on an underestimated standard deviation of noise modeled for the input image and alpha-rooting the 1D transform-domain coefficients. Shrinking the 1D transform-domain coefficients may include hard-thresholding or soft-thresholding the 1D transform-domain coefficients. Further, the modifying of the 1D transform-domain coefficients may be performed using a single nonlinear operator to both shrink and enhance the 1D transform-domain coefficients.

According to some embodiments, generating the pilot image includes: applying an inverse of the 1D transform to the first plurality of transformed 3D stacks comprising the modified 1D transform-domain coefficients to obtain a corresponding first plurality of filtered 3D stacks of image blocks and aggregating the image blocks comprised in the first plurality of filtered 3D stacks into the pilot image.

In some embodiments, information derived from the pilot image is used in a second filter that is applied to the input image to generate a filtered image. In this regard, a second plurality of 3D stacks of image blocks is constructed by stacking together similar image blocks extracted from the pilot image. A third plurality of 3D stacks of image blocks is constructed by stacking together image blocks from the input image that are extracted according to the spatial locations of the image blocks extracted from the pilot image. A 1D transform is applied to both of the second and the third plurality of 3D stacks of image blocks along the dimension of the stacking to obtain corresponding second and third plurality of transformed 3D stacks, where each transformed 3D stack includes 1D transform-domain coefficients. The 1D transform-domain coefficients of the third plurality of transformed 3D stacks is modified based on the 1D transform-domain coefficients of the second plurality of transformed 3D stacks. A filtered image is then generated using the second plurality of transformed 3D stacks comprising the modified 1D transform-domain coefficients. In some embodiments, the modifying of the 1D transform-domain coefficients of the third plurality of 3D stacks includes performing a Wiener-filtering on the 1D transform-domain coefficients of the third plurality of transformed 3D stacks using Wiener coefficients obtained based on the 1D transform-domain coefficients of the second plurality of transformed 3D stacks.

In some embodiments, generating the filtered image includes: applying the inverse of the 1D transform to the third plurality of transformed 3D stacks comprising the modified 1D transform-domain to obtain a corresponding second plurality of filtered 3D stacks of image blocks and aggregating the image blocks comprised in the second plurality of filtered 3D stacks into the filtered image.

The 1D transform may include a variance stabilizing transform configured to process data that follows a signal-dependent noise distribution. The signal-dependent noise distribution may include a Poisson distribution.

According to some embodiments, the input image is obtained by applying a pre-filter to an original image according to an underestimated standard deviation of noise modeled for the original image. The pre-filter of the original image may include: constructing a fourth plurality of 3D stacks of image blocks extracted from the original image, applying a 3D transform to the fourth plurality of 3D stacks of image blocks to obtain a corresponding fourth plurality of transformed 3D stacks, where each transformed 3D stack comprises 3D transform-domain coefficients, shrinking the 3D transform-domain coefficients of the fourth plurality of transformed 3D stacks based on the underestimated standard deviation of the noise to suppress the noise in the original image, and generating the pre-filtered original image as the input image using the fourth plurality of transformed 3D stacks. It has been contemplated that this process of filtering can be repeated as many times as desired to achieve an intended image quality. In subsequent iterations, the process is repeated with the filtered image as the original image.

To construct the first plurality of 3D stacks of image blocks, for each input image reference block: one or more matching image blocks from the input image that meet a similarity condition with the input image reference block are identified, the one or more matching image blocks are extracted from the input image, and the input image reference block together with the one or more matching blocks that were extracted from the input image are stacked together to form a corresponding one of the first plurality of 3D stacks of image blocks.

To construct the second and the third plurality of 3D stacks of image blocks, the pilot image is divided into a plurality of pilot image reference blocks. For each pilot image reference block, one or more matching image blocks from the pilot image that meet the similarity condition with the pilot image reference block are identified, the one or more matching image blocks from the pilot image are extracted and then stacked together with the pilot image reference block to construct a corresponding one of the second plurality of 3D stacks of image blocks. A plurality of image blocks are also extracted from the input image at the same spatial locations as the pilot image reference block and the one or more matching blocks from the pilot image. The plurality of image blocks extracted from the input image are stacked to construct a corresponding one of the third plurality of 3D stacks of image blocks.

BRIEF DESCRIPTION OF THE DRAWINGS

FIGS. 2A-2F illustrate a set of sample results from using the two-stage collaborative filtering and sharpening process in accordance with an embodiments of the disclosure and other alternative image denoising processes.

FIGS. 3A-3F illustrate another set of sample results from using the two-stage collaborative filtering and sharpening process in accordance with an embodiments of the disclosure and other alternative image denoising processes.

FIGS. 4A-4F illustrate yet another set of sample results from using the two-stage collaborative filtering and sharpening process in accordance with an embodiments of the disclosure and other alternative image denoising processes.

DETAILED DESCRIPTION

Figure 1:
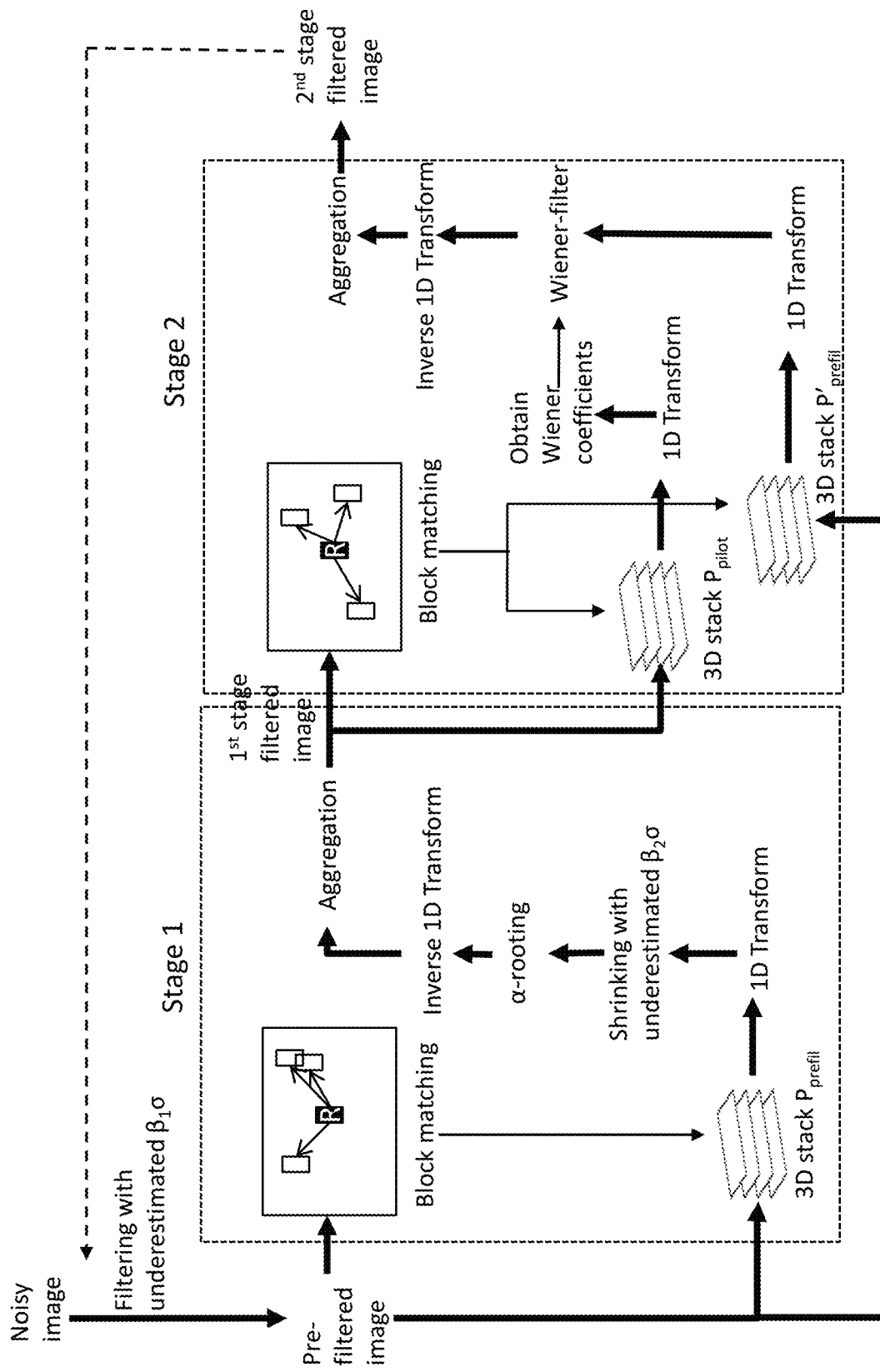
FIG. 1 illustrates the two-stage collaborative filtering and sharpening process in accordance with an embodiment of the disclosure.

Various techniques are disclosed for reduction of noise and enhancement of sharpness of an image. According to some embodiments, a digital input image $Y_{noisy}$ is received. A pre-filter may be applied to the input image $Y_{noisy}$ to generate a pre-filtered image $Y_{prefilt}$ in order to provide an initial suppression of noise. A first plurality of 3D stacks of image blocks $P_{prefilt}$ may be constructed by stacking together similar image blocks extracted from the pre-filtered image $Y_{prefilt}$. A 1D transform may be applied to the first plurality of 3D stacks of image blocks $P_{prefilt}$ along the stacking dimension (i.e., similarity dimension) to obtain a corresponding first plurality of transformed 3D stacks $S_{prefilt}$, each transformed 3D stack includes 1D transform-domain coefficients. The 1D transform domain coefficients may be modified to enhance the differences with respect to the dimension of the stacking. A pilot image $Y_{pilot}$ is generated using the first plurality of transformed 3D stacks comprising the modified 1D transform-domain coefficients.

A second plurality of 3D stacks of image blocks $P_{pilot}$ is constructed by stacking together similar image blocks that are extracted from the pilot image $Y_{pilot}$. A third plurality of 3D stacks of image blocks $P'_{prefilt}$ is constructed by stacking together image blocks from the pre-filtered image that are extracted according to the spatial locations of the image blocks extracted from the pilot image. A 1D transform is applied to both of the second and the third plurality of 3D stacks of image blocks ($P_{pilot}$ and $P'_{prefilt}$) along the stacking dimension to obtain corresponding second and third plurality of transformed 3D stacks $S_{pilot}$ and $S'_{prefilt}$, where each transformed 3D stack includes 1D transform-domain coefficients. The 1D transform-domain coefficients of the third plurality of transformed 3D stacks $S'_{prefilt}$ are modified based on the 1D transform-domain coefficients of the second plurality of transformed 3D stacks $S_{pilot}$. A filtered image is generated using the second plurality of transformed 3D stacks $S'_{prefilt}$ comprising the modified 1D transform-domain coefficients.

The input image $Y_{noisy}$ might be captured by an image capture device (e.g., a CMOS, a CCD, other visible-light imaging sensor, infrared (IR) imaging sensors, photonic mixer devices (PMD) other time-of-flight (ToF) imaging sensors, laser imaging detection and ranging (LIDAR) devices, and positron emission tomography (PET), single-photon emission computed tomography (SPECT), ultrasound imaging, or other medical imaging device). The input image $Y_{noisy}$ was captured of a particular scene.

The input image $Y_{noisy}$ might include noise for various reasons. Noise is image data within the image that is not part of the scene, but instead is created artificially by the system that captures the image (e.g., part of the circuitry or sensor for capturing image data of the scene). One of the characteristics of noise is that it is often unevenly distributed, which makes it more difficult to be identified and subsequently removed. As such, noise is undesirable in an image.

According to some embodiments, the input image $Y_{noisy}$ may be modeled as an image corrupted by independent identically distributed Gaussian noise $N(0,\sigma^2)$, with zero, mean and standard deviation $\sigma$. A pre-filter (e.g., an arbitrary denoising filter), having an underestimated noise standard deviation $\beta_1\sigma$, where $0<\beta_1<1$, may be applied to the input image $Y_{noisy}$ to generate a pre-filtered image $Y_{prefilt}$. For example, a sparse 3D transform domain collaborative filtering technique (also referred to herein as "the BM3D technique"), which is described in "Image de-noising by sparse 3D transform domain collaborative filtering" by K. Dabov, A. Foi, V. Katkovnik, and K. Egiazarian, IEEE Transactions on Image Processing, 16(82):3736-3745, 2007 (which is incorporated by reference herein in its entirety, and will be referred to as "Dabov 2007" hereinafter), may be used to pre-filter the input image, but using an underestimation of the standard deviation of noise as discussed above.

A two-stage filtering and sharpening approach (also hereinafter referred to as "BM1D filtering") may then be performed on the pre-filtered image $Y_{prefilt}$ to boost "inter-domain" correlation, thereby preserving at least some of the difference in pixel values (hence the image details) that may be lost due to the pre-filtering (e.g., due to the collaborative filtering of similar blocks in the BM3D filtering).

According to one or more embodiments, the two-staged filtering and sharpening process comprises the following operations:

Stage 1 (Groupwise Filtering and Enhancement):

During the first stage of the two-stage filtering and sharpening approach, the pre-filtered image $Y_{prefilt}$ is divided into multiple reference patches $p_{prefilt}$. Each reference patch $p_{prefilt}$ includes a portion of the input image having contiguous pixels (two-dimensional (2D)). Preferably, the reference patches $p_{prefilt}$ are non-overlapping and collectively cover the at least a majority of the pre-filtered image. Even more preferably, the reference patches $p_{prefilt}$ collectively cover the entire pre-filtered image.

For every reference two-dimensional (2D) patch $p_{prefilt}$ extracted from the pre-filtered image $Y_{prefilt}$, identify and extract a group of patches similar to the reference patch $p_{prefilt}$ using, for example, a block-matching procedure that is described in detail in Dabov 2007 referenced herein above. The group of matching patches that corresponds to a reference patch $p_{prefilt}$ are similar with the corresponding reference patch $p_{prefilt}$. In some embodiments, the group of matching patches are mutually similar with each other and with the corresponding reference patch $p_{prefilt}$.

The group of matching patches and the corresponding reference block $p_{prefilt}$ are stacked together to form a three-dimensional (3D) array of pixels (a 3D stack of image blocks) $P_{prefilt}$. A one-dimensional (1D) transform (e.g., a 1D Haar transform) may be applied to each vector of the 3D array of pixels $P_{prefilt}$ along the third dimension (e.g., along the stacking dimension or, equivalently, along similarity), resulting in a 3D array of T-transform coefficients $S_{prefilt}$.

The 3D array of T-transform coefficients $S_{prefilt}$ is then shrunk based on an underestimated noise standard deviation $\beta_2\sigma$ (where $0<\beta_2<1$). In some embodiments, the shrinking may comprise hard-thresholding the coefficients $S_{prefilt}$ with the underestimated noise standard deviation $\beta_2\sigma$. In some other embodiments, instead of the hard-thresholding, a different shrinkage operator such as a soft-thresholding operator can be applied to the 3D array of T-transform coefficients $S_{prefilt}$ instead.

The shrunk 3D array of T-transform coefficients are then further modified to boost or enhance the differences in pixel values for the same spatial locations of the matched image blocks grouped to form the 3D array of pixels $P_{prefilt}$ (i.e., the differences with respect to the similarity or stacking dimension). In some embodiments, the modifying of the shrunk coefficients in the T-transform domain to boost or enhance the differences of pixel values same spatial locations of matched similar blocks in the image domain may comprise alpha-rooting (also referred to as "α-rooting") the coefficients with $\alpha \geq 1$. In yet some other embodiments, the shrinkage and enhancement in this step are combined into a single nonlinear operator.

Then, an inverse 1D transform that corresponds to the 1D transform may be applied to the 3D array of T-transform coefficients $S_{prefilt}$ to generate a filtered 3D array of pixels $P_{filt}$, where the differences with respect to the third dimension (i.e., similarity or stacking dimension) are enhanced. As a result of this step, for each reference patch $P_{prefilt}$ extracted from the pre-filtered image $Y_{prefilt}$, a group of filtered patches is generated. It is noted that the different groups of filtered patches might cover overlapping regions of the image.

As such, the different groups of filtered patches that correspond to the same spatial location within the image are then aggregated to form a first filtered image $Y_{pilot}$, as a weighted average of all pixels coming from the filtered patches in the different groups of filtered patches.

Stage 2 (Groupwise Wiener Filtering):

In the second stage of the two-stage filtering and sharpening process, the first filtered image $Y_{pilot}$ is again divided into multiple reference patches $p_{pilot}$. Again, for each of the reference patch $p_{pilot}$, a group of matching patches that are similar to the reference match $p_{pilot}$ is identified and extracted (similar to the grouping process discussed above and described in Dabov 2007) from the first filtered image $Y_{pilot}$. The group of matching patches and the corresponding reference patch $p_{pilot}$ are stacked together to form a first 3D array of pixels $P_{pilot}$.

Using the location of the reference patch and the locations identified for the group of matching patches in the first filtered image $Y_{pilot}$, a group of patches are extracted from the pre-filtered image $Y_{prefilt}$ (e.g., the relative locations in the pre-filtered image). The group of patches extracted from the pre-filtered image $Y_{prefilt}$ are then stacked together to form a second 3D array of pixels $P'_{prefilt}$. It is noted that the second 3D array of pixels $P'_{prefilt}$ is different from the 3D array of pixels $P_{prefilt}$ formed during the first stage in that the group is driven by the similarity found within the filtered image $Y_{pilot}$ instead of the pre-filtered image $Y_{prefilt}$.

A 1D transform (e.g., 1D Haar Transform) is applied to pixels of the first 3D array of pixels $P_{pilot}$ along the third dimension to generate a first 3D array of T-transform coefficients $S_{pilot}$. The same 1D transform is also applied to pixels of the second 3D array of pixels $P'_{prefilt}$ along the third dimension to generate a second 3D array of T-transform coefficients $S'_{prefilt}$.

Next, a 3D array of empirical Wiener-filter coefficients W is defined based on the first 3D array of T-transform coefficients $S_{pilot}$, with the assumption of noise variance $\beta_2^2\sigma^2$. The inverse 1D transform is applied to the element-wise product $WS'_{prefilt}$ of the weiner-filter coefficients and the second 3D array of T-transform coefficients, resulting in a Wiener-filtered 3D array $P_{wiener}$. Hence, for each reference patch extracted from the filtered image, a Wiener-filtered group is obtained.

The Wiener-filtered groups are aggregated to form a Wiener-filtered image $Y_{wiener}$, as a weight average of all pixels coming from the Wiener-filtered patches included in the different Wiener-filtered groups $P_{wiener}$. The Wiener-filtered image can be used as an output of this noise reduction and sharpness enhancement process. Although the non-limiting example illustrated with reference to FIG. 1 utilizes a Wiener filter, it is contemplated that other empirical filters that take $S_{pilot}$ as an estimated signal to reconstruct a noiseless version of $S'_{prefilt}$ may be utilized for other embodiments.

In some embodiments, this two-stage filtering and sharpening process can be performed in combination with a variance stabilizing transformation (and corresponding inverse transformation) to process data that follows a signal-dependent noise distribution (e.g., Poisson distribution).

In some embodiments, the two-stage filtering and sharpening process described above can be repeatedly performed on the same image as many times as desired. The output of each iteration (e.g., the Wiener-filtered image generated from a previous iteration) becomes the input image of the next iteration. Different parameters or operators can be used for different objectives. For example, the two-stage filtering and sharpening process may be applied for image deblurring process by, for example, embedding convolution and deconvolution operators within the repeated steps. In another example, the two-stage filtering and sharpening process may be applied for image super-resolution by, for example, embedding downsampling and upsampling operators within the repeated steps. In yet another example, the two-stage filtering and sharpening process may be applied for image inpainting by, for example, embedding masking and interpolation operators within the repeated steps. In yet another example, the two-stage filtering and sharpening process may be applied for inverse imaging by, for example, embedding relevant forward and backward operators within the repeated steps. FIG. 1 is a block diagram that illustrates the various techniques of some embodiments disclosed above.

EXAMPLES

We consider BM3D (as described in Dabov 2007) as the default image filter which we are going to improve upon.

Let us considered different scenarios:

1) A smooth reference patch. It may happen that in the group of similar patches one can find a patch (let's call it B) which will have value in (i; j) coordinate much different than those values on the same position in other patches. A collaborative filtering of a 3D cube results in a loss of information in the position (i; j) of the patch B, i.e. a potential loss of an image detail. This problem is becoming worse in the case of incorrect block matching of noisy images.

2) A non-smooth reference patch. Similarly to the previous case, one has to be sure not to introduce a blur in the case of inter-domain filtering, and to avoid a possible blur occurring due to a use of non-sparsifying transform in the spatial domain.

To resolve this problem, embodiments of the disclosure advantageously increase sparsity in 'inter-domain,' keeping possible difference in pixel values located at the same spatial locations in similar blocks. This can be done in one or more embodiments by extra filtering in 'inter-domain,' performed in two stages: first, by alpha-rooting hard-thresholded estimates, and second, by Wiener filtering applied in 'inter-domain'. Note that application of BM1D (a special case of BM3D, when the spatial 2D transform matrix in BM3D is set to identity matrix) results in a sharper estimate, but, at the same time, leaves a residual noise which may look like a set of impulses in the filtered image (see FIG. 2e, FIG. 3e, FIG. 4e).

In order to balance between a good decorrelation property in the spatial domain and fine detail preservation by boosting the 'inter-domain' correlation, some embodiments of the disclosure perform repetitive filtering, producing first estimates by a user-specified filter (e.g. by BM3D), then sharpen the details by BM1D filtering. For example, in order not to increase too much computational complexity of the algorithm, only a few repetitions (e.g., 2 to 3 repetitions) are used.

FIG. 3 shows an example of an image with more spatial correlation between of image pixels than in the previous example in FIG. 2. We can see that now BM3D outperforms BM1D. Sliding local transform based filter (SDCT) (as described in "Adaptive de-noising and lossy compression of images in transform domain", by K. Egiazarian, J. Astola, M. Helsingius and P. Kuosmanen, J. Electron. Imaging (referred to as "Egiazarian 1999"). performs close to BM3D for images in FIG. 2 and FIG. 3. Note, that SDCT filter can be considered as a special case of BM3D (setting a number of similar patches for both hard-thresholding and wiener stages to 1). The last images in FIGS. 2 and 3 show denoising results using a proposed image filter, which significantly outperform SDCT, BM3D and BM1D both visually, and in PSNR/SSIM values.

FIG. 4 shows an example of a texture image. Here we see that BM3D significantly outperforms SDCT due to a collaborative filtering of similar patches (inter-domain). It also outperforms BM1D, since the last filter is not able to decorrelate an existing spatial correlation in the patch space (intra-domain). An example of the proposed approach to produce first estimates by BM3D filtering and then sharpen the details by BM1D filtering (also referred to herein as "BM3D1Ds") demonstrates again better filtering performance.

Figure 5:
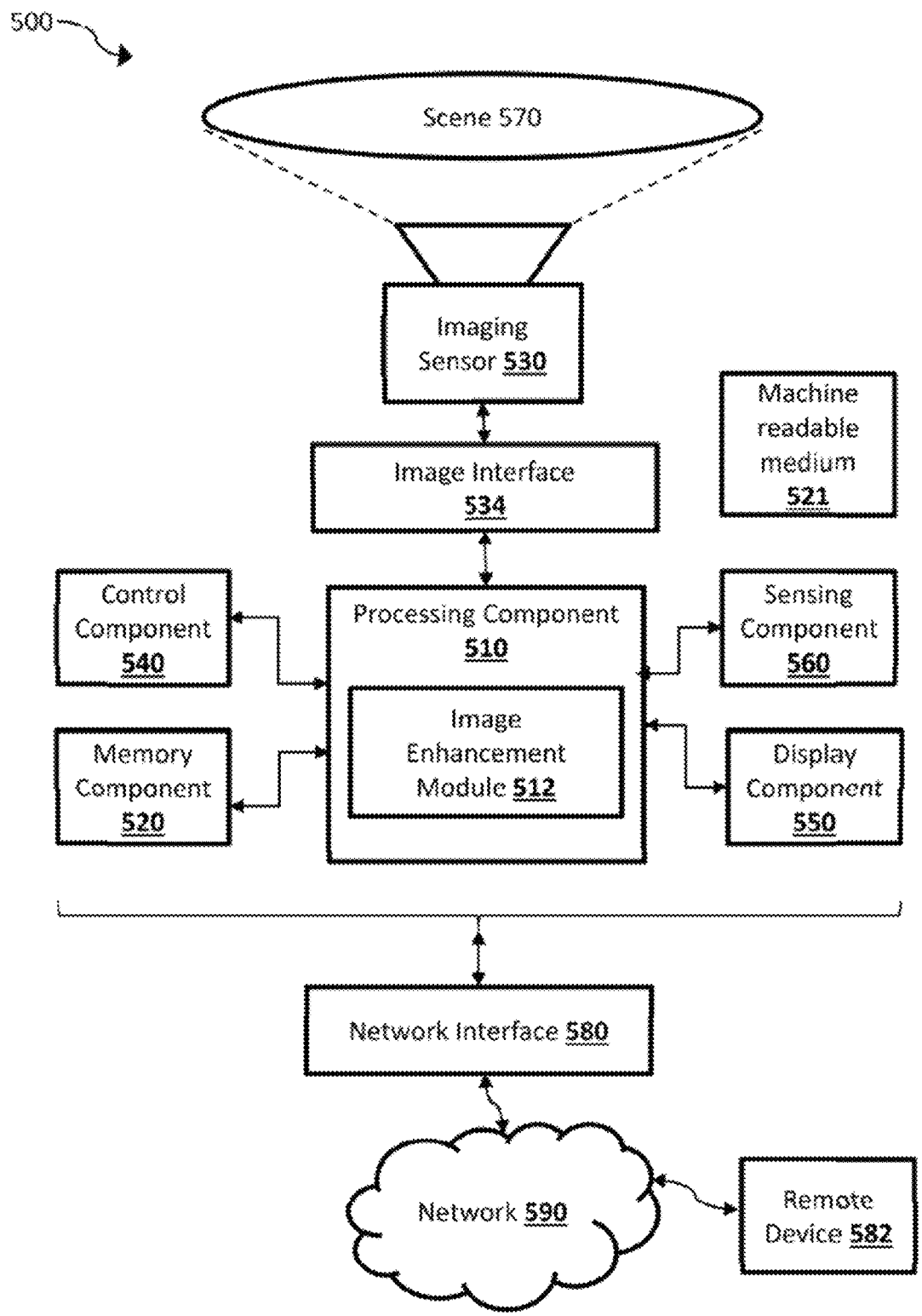
FIG. 5 illustrates a block diagram of an imaging system in accordance with an embodiment of the disclosure.

FIG. 5 illustrates a block diagram of a system 500 for capturing and processing images and videos (e.g., video frames) in accordance with an embodiment of the disclosure. System 500 comprises, according to one implementation, a processing component 510, a memory component 520, an imaging sensor 530, a video interface component 534, a control component 540, a display component 550, a sensing component 560, and/or a network interface 580.

System 500 may represent an imaging device, such as a video and/or still camera, to capture and process images and/or videos of a scene 570. In this regard, the imaging sensor 530 of system 500 may be configured to capture images (e.g., still and/or video images) of scene 570 in a particular spectrum or modality. For example, in some embodiments, the imaging sensor 530 may include a complementary metal oxide semiconductor (CMOS) sensor or a charge-coupled device (CCD sensor that can be found in any consumer camera. In some other embodiments, the imaging sensor 530 may include an IR imaging sensor configured to detect IR radiation in the near, middle, and/or far IR spectrum and provide IR images (e.g., IR image data or signal) representative of the IR radiation from scene 570. In one specific, not-limiting example, the imaging sensor 530 may comprise a long-wave IR (LWIR) (e.g., a thermal IR) imaging sensor having a focal plane array (FPA) of detectors responsive to thermal IR radiation including LWIR radiation.

Other imaging sensors that may be embodied in the imaging sensor 530 include a PMD imaging sensor or other ToF imaging sensor, LIDAR imaging device, millimeter imaging device, PET scanner, SPECT scanner, ultrasonic imaging device, or other imaging devices operating in particular modalities and/or spectra. It is noted that for some of these imaging sensors that are configured to capture images in particular modalities and/or spectra, it is expensive or difficult to produce high resolution, high definition, and/or high SNR output images, for example, when compared with a typical CMOS-based or CCD-based imaging sensors or other imaging sensors, imaging scanners, or imaging devices of different modalities.

Processing component 510, according to various embodiments, comprises one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. For example, processing component 510 may include an image enhancement module 512, which may represent any suitable combination of hardware components and software instructions, configured to perform various operations to enhance images as discussed herein above with reference to FIGS. 1 through 4. Processing component 510 is configured to interface and communicate with various other components of system 500 to perform such operations. In one aspect, processing component 510 according to some embodiments may be configured to perform various system control operations (e.g., to control communications and operations of various components of system 500) and other image processing operations (e.g., data conversion, video analytics, noise suppression), as part of or separate from the operations to enhance the resolution of images.

It should be appreciated that image enhancement module 512 may, in some embodiments, be integrated in software and/or hardware as part of processing component 510, with code (e.g., software instructions and/or configuration data) for image enhancement module 512 stored, for example, in memory component 520. In some embodiments, a separate machine-readable medium 521 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations disclosed herein. In one aspect, machine-readable medium 521 may be portable and/or located separate from system 500, with the stored software instructions and/or data provided to system 500 by coupling the computer-readable medium to system 500 and/or by system 500 downloading (e.g., via a wired link and/or a wireless link) from computer-readable medium 521.

Memory component 520 comprises, in one embodiment, one or more memory devices configured to store data and information, including video image data and information. Memory component 520 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, processing component 510 may be configured to execute software instructions stored in memory component 520 so as to perform method and process steps and/or operations described herein. Processing component 510 and/or image interface 534 may be configured to store in memory component 520 images or digital image data captured by the imaging sensor 530. Processing component 510 may be configured to store processed still and/or video images (e.g., pre-filtered, filtered, and/or Wiener-filtered images, as discussed herein) in memory component 520.

Image interface 534 may include, in some embodiments, appropriate input ports, connectors, switches, and/or circuitry configured to interface with external devices (e.g., a remote device 582 and/or other devices) to receive images (e.g., digital image data) generated by or otherwise stored at the external devices. The received images or image data may be provided to processing component 510. In this regard, the received images or image data may be converted into signals or data suitable for processing by processing component 510. For example, in one embodiment, image interface 534 may be configured to receive analog video data and convert it into suitable digital data to be provided to processing component 510.

In some embodiment, image interface 534 may comprise various standard video ports, which may be connected to a video player, a video camera, or other devices capable of generating standard video signals, and may convert the received video signals into digital video/image data suitable for processing by processing component 510. In some embodiments, image interface 534 may also be configured to interface with and receive images (e.g., image data) from the imaging sensor 530. In other embodiments, the imaging sensor 530 may interface directly with processing component 510.

Control component 540 comprises, in one embodiment, a user input and/or interface device, such as a rotatable knob (e.g., potentiometer), push buttons, slide bar, keyboard, and/or other devices, that is adapted to generate a user input control signal. Processing component 510 may be configured to sense control input signals from a user via control component 540 and respond to any sensed control input signals received therefrom. Processing component 510 may be configured to interpret such a control input signal as a value, as generally understood by one skilled in the art. In one embodiment, control component 540 may comprise a control unit (e.g., a wired or wireless handheld control unit) having push buttons adapted to interface with a user and receive user input control values. In one implementation, the push buttons of the control unit may be used to control various functions of system 500, such as autofocus, menu enable and selection, field of view, brightness, contrast, noise filtering, image enhancement, and/or various other features of an imaging system or camera.

Display component 550 comprises, in one embodiment, an image display device (e.g., a liquid crystal display (LCD)) or various other types of generally known video displays or monitors. Processing component 510 may be configured to display image data and information on display component 550. Processing component 510 may be configured to retrieve image data and information from memory component 520 and display any retrieved image data and information on display component 550. Display component 550 may comprise display circuitry, which may be utilized by the processing component 510 to display image data and information. Display component 550 may be adapted to receive image data and information directly from the imaging sensor 530, processing component 510, and/or video interface component 534, or the image data and information may be transferred from memory component 520 via processing component 510.

Sensing component 560 comprises, in one embodiment, one or more sensors of various types, depending on the application or implementation requirements, as would be understood by one skilled in the art. Sensors of sensing component 560 provide data and/or information to at least processing component 510. In one aspect, processing component 510 may be configured to communicate with sensing component 560. In various implementations, sensing component 560 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. Sensing component 560 may represent conventional sensors as generally known by one skilled in the art for monitoring various conditions (e.g., environmental conditions) that may have an effect (e.g., on the image appearance) on the image data provided by imaging sensor 530.

In some implementations, sensing component 560 (e.g., one or more of sensors) may comprise devices that relay information to processing component 510 via wired and/or wireless communication. For example, sensing component 560 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, processing component 510 can use the information (e.g., sensing data) retrieved from sensing component 560 to modify a configuration of imaging sensor 530 (e.g., adjusting a light sensitivity level, adjusting a direction or angle of the imaging sensor 530, adjusting an aperture, etc.).

In various embodiments, various components of system 500 may be combined and/or implemented or not, as desired or depending on the application or requirements. In one example, processing component 510 may be combined with memory component 520, the imaging sensor 530, video interface component 534, display component 550, network interface 580, and/or sensing component 560. In another example, processing component 510 may be combined with the imaging sensor 530, such that certain functions of processing component 510 are performed by circuitry (e.g., a processor, a microprocessor, a logic device, a microcontroller, etc.) within the imaging sensor 530.

Furthermore, in some embodiments, various components of system 500 may be distributed and in communication with one another over a network 590. In this regard, system 500 may include network interface 580 configured to facilitate wired and/or wireless communication among various components of system 500 over network. In such embodiments, components may also be replicated if desired for particular applications of system 500. That is, components configured for same or similar operations may be distributed over a network. Further, all or part of any one of the various components may be implemented using appropriate components of a remote device 582 (e.g., a conventional digital video recorder (DVR), a computer configured for image processing, and/or other device) in communication with various components of system 500 via network interface 580 over network 590, if desired. Thus, for example, all or part of processor 510, all or part of memory component 520, and/or all of part of display component 550 may be implemented or replicated at remote device 582, and configured to perform resolution enhancement of images as further described herein.

In some embodiments, system 500 may not comprise imaging sensors (e.g., imaging sensor 530), but instead receive images or image data from imaging sensors located separately and remotely from processing component 510 and/or other components of system 500. It will be appreciated that many other combinations of distributed implementations of system 500 are possible, without departing from the scope and spirit of the disclosure. System 500 may comprise a portable device and may be incorporated, for example, into a vehicle (e.g., an automobile or other type of land-based vehicle, an unmanned aerial vehicle (UAV), unmanned aircraft system (UAS), drone, or other type of aircraft or spacecraft) or a non-mobile installation requiring images to be stored and/or displayed.

What is claimed is:

1. A method of enhancing an input image, the method comprising:
    constructing a first plurality of three-dimensional (3D) stacks of image blocks by stacking together similar image blocks extracted from the input image;
    applying a one-dimensional (1D) transform to the first plurality of 3D stacks of image blocks along the dimension of the stacking to obtain a corresponding first plurality of transformed 3D stacks, each comprising 1D transform-domain coefficients;
    modifying the 1D transform-domain coefficients of the first plurality of transformed 3D stacks to enhance the differences with respect to the dimensions of the stacking;
    generating a first filtered image using the first plurality of transformed 3D stacks comprising the modified 1D transform-domain coefficients;
    constructing a second plurality of 3D stacks of image blocks by stacking together similar image blocks extracted from the first filtered image;
    constructing a third plurality of 3D stacks of image blocks by stacking together image blocks from the input image extracted according to the spatial locations of the image blocks extracted from the first filtered image;
    applying a 1D transform to the second and the third plurality of 3D stacks of image blocks along the dimension of the stacking to obtain corresponding second and third plurality of transformed 3D stacks, each comprising 1D transform-domain coefficients;
    modifying the 1D transform-domain coefficients of the third plurality of transformed 3D stacks based on the 1D transform-domain coefficients of the second plurality of transformed 3D stacks; and
    generating a second filtered image using the second plurality of transformed 3D stacks comprising the modified 1D transform-domain coefficients.

2. The method of claim 1, further comprising:
    pre-filtering an original image according to an underestimated standard deviation of noise modeled for the original image; and
    providing the pre-filtered original image as the input image.

3. The method of claim 2, wherein the pre-filtering of the original image comprises:
    constructing a fourth plurality of 3D stacks of image blocks by stacking together similar image blocks extracted from the original image;
    applying a 3D transform to the fourth plurality of 3D stacks of image blocks to obtain a corresponding fourth plurality of transformed 3D stacks, each comprising 3D transform-domain coefficients;
    shrinking the 3D transform-domain coefficients of the fourth plurality of transformed 3D stacks based on the underestimated standard deviation of the noise to suppress the noise in the original image; and
    generating the pre-filtered original image using the fourth plurality of transformed 3D stacks.

4. The method of claim 2, wherein the method is repeated with the second filtered image as the original image.

5. The method of claim 1, wherein the constructing of the first plurality of 3D stacks of image blocks comprises:
    dividing the input image into a plurality of input image reference blocks; and
    for each input image reference block:
        identifying one or more matching image blocks from the input image that meet a similarity condition with the input image reference block;
        extracting the one or more matching image blocks from the input image; and
        stacking the input image reference block together with the one or more matching blocks extracted from the input image to construct a corresponding one of the first plurality of 3D stacks of image blocks, wherein the constructing of the second and the third plurality of 3D stacks of image blocks comprises:

dividing the first filtered image into a plurality of filtered image reference blocks; and for each filtered image reference block:

identifying one or more matching image blocks from the first filtered image that meet the similarity condition with the filtered image reference block;

extracting the one or more matching image blocks from the first filtered image;

stacking the filtered image reference block together with the one or more matching image blocks extracted from the first filtered image to construct a corresponding one of the second plurality of 3D stacks of image blocks;

extracting a plurality of image blocks from the input image at the same spatial locations as the filtered image reference block and the one or more matching blocks from the first filtered image; and stacking the plurality of image blocks extracted from the input image to construct a corresponding one of the third plurality of 3D stacks of image blocks.

6. The method of claim 1, wherein the modifying of the 1D transform-domain coefficients of the first plurality of transformed 3D stacks comprises alpha-rooting the 1D transform-domain coefficients and further comprises shrinking, prior to the alpha-rooting, the 1D transform-domain coefficients based on an underestimated standard deviation of noise modeled for the input image, wherein the shrinking of the 1D transform-domain coefficients comprises hard-thresholding or soft-thresholding the 1D transform-domain coefficients.

7. The method of claim 1, wherein the modifying of the 1D transform-domain coefficients of the first plurality of transformed 3D stacks is performed using a single nonlinear operator to both shrink and enhance the 1D transform-domain coefficients.

8. The method of claim 1, wherein the modifying of the 1D transform-domain coefficients of the third plurality of transformed 3D stacks comprises performing a Wiener filtering on the 1D transform-domain coefficients of the third plurality of transformed 3D stacks using Wiener coefficients obtained based on the 1D transform-domain coefficients of the second plurality of transformed 3D stacks.

9. The method of claim 1, wherein the 1D transform includes a variance stabilizing transform configured to process data that follows a signal-dependent noise distribution, and the signal-dependent noise distribution includes a Poisson distribution.

10. The method of claim 1, wherein the generating of the first filtered image comprises:

applying an inverse of the 1D transform to the first plurality of transformed 3D stacks comprising the modified 1D transform-domain coefficients to obtain a corresponding first plurality of filtered 3D stacks of image blocks; and aggregating the image blocks comprised in the first plurality of filtered 3D stacks into the first filtered image; and wherein the generating of the second filtered image comprises:

applying the inverse of the 1D transform to the third plurality of transformed 3D stacks comprising the modified 1D transform-domain coefficients to obtain a corresponding second plurality of filtered 3D stacks of image blocks; and aggregating the image blocks comprised in the second plurality of filtered 3D stacks into the second filtered image.

11. The method of claim 1, further comprising at least one of the following sets of operations:

convolution and deconvolution operations to perform image deblurring;

downsampling and upsampling operations to perform image super-resolution;

masking and interpolation operations to perform image inpainting; and forward and backward operations to perform inverse imaging.

12. A system, comprising:

an image interface;

a non-transitory memory storing computer instructions;

one or more hardware processors communicatively coupled to the image interface and the non-transitory memory, the one or more hardware processors configured to read the computer instructions from the non-transitory memory to cause the system to perform operations comprising:

constructing a first plurality of three-dimensional (3D) stacks of image blocks by stacking together similar image blocks extracted from the input image;

applying a one-dimensional (1D) transform to the first plurality of 3D stacks of image blocks along the dimension of the stacking to obtain a corresponding first plurality of transformed 3D stacks, each comprising 1D transform-domain coefficients;

modifying the 1D transform-domain coefficients of the first plurality of transformed 3D stacks to enhance the differences with respect to the dimensions of the stacking;

generating a first filtered image using the first plurality of transformed 3D stacks comprising the modified 1D transform-domain coefficients;

constructing a second plurality of 3D stacks of image blocks by stacking together similar image blocks extracted from the first filtered image;

constructing a third plurality of 3D stacks of image blocks by stacking together image blocks from the input image extracted according to the spatial locations of the image blocks extracted from the first filtered image;

applying a 1D transform to the second and the third plurality of 3D stacks of image blocks along the dimension of the stacking to obtain corresponding second and third plurality of transformed 3D stacks, each comprising 1D transform-domain coefficients;

modifying the 1D transform-domain coefficients of the third plurality of transformed 3D stacks based on the 1D transform-domain coefficients of the second plurality of transformed 3D stacks; and generating a second filtered image using the second plurality of transformed 3D stacks comprising the modified 1D transform-domain coefficients.

13. The system of claim 12, wherein the operations further comprise:

receiving an original image via the image interface;

pre-filtering the original image according to an underestimated standard deviation of noise modeled for the original image; and providing the pre-filtered original image as the input image.

14. The system of claim 13, wherein the pre-filtering of the original image comprises:

constructing a fourth plurality of 3D stacks of image blocks by stacking together similar image blocks extracted from the original image;

applying a 3D transform to the fourth plurality of 3D stacks of image blocks to obtain a corresponding fourth plurality of transformed 3D stacks, each comprising 3D transform-domain coefficients;

shrinking the 3D transform-domain coefficients of the fourth plurality of transformed 3D stacks based on the underestimated standard deviation of the noise to suppress the noise in the original image; and generating the pre-filtered original image using the fourth plurality of transformed 3D stacks.

15. The system of claim 13, wherein the operations are repeated with the second filtered image as the original image.

16. The system of claim 12, wherein the constructing of the first plurality of 3D stacks of image blocks comprises:
dividing the input image into a plurality of input image reference blocks; and
for each input image reference block:
identifying one or more matching image blocks from the input image that meet a similarity condition with the input image reference block;
extracting the one or more matching image blocks from the input image; and
stacking the input image reference block together with the one or more matching blocks extracted from the input image to construct a corresponding one of the first plurality of 3D stacks of image blocks,
wherein the constructing of the second and the third plurality of 3D stacks of image blocks comprises:
dividing the first filtered image into a plurality of filtered image reference blocks; and
for each filtered image reference block:
identifying one or more matching image blocks from the first filtered image that meet the similarity condition with the filtered image reference block;
extracting the one or more matching image blocks from the first filtered image;
stacking the filtered image reference block together with the one or more matching image blocks extracted from the first filtered image to construct a corresponding one of the second plurality of 3D stacks of image blocks;
extracting a plurality of image blocks from the input image at the same spatial locations as the filtered image reference block and the one or more matching blocks from the first filtered image; and
stacking the plurality of image blocks extracted from the input image to construct a corresponding one of the third plurality of 3D stacks of image blocks.

17. The system of claim 12, wherein the modifying of the 1D transform-domain coefficients of the first plurality of transformed 3D stacks comprises alpha-rooting the 1D transform-domain coefficients and further comprises shrinking, prior to the alpha-rooting, the 1D transform-domain coefficients based on an underestimated standard deviation of noise modeled for the input image, wherein the shrinking of the 1D transform-domain coefficients comprises hard-thresholding or soft-thresholding the 1D transform-domain coefficients.

18. The system of claim 12, wherein the modifying of the 1D transform-domain coefficients of the first plurality of transformed 3D stacks is performed using a single nonlinear operator to both shrink and enhance the 1D transform-domain coefficients.

19. The system of claim 12, wherein the modifying of the 1D transform-domain coefficients of the third plurality of transformed 3D stacks comprises performing a Wiener filtering on the 1D transform-domain coefficients of the third plurality of transformed 3D stacks using Wiener coefficients obtained based on the 1D transform-domain coefficients of the second plurality of transformed 3D stacks.

20. The system of claim 12, wherein the 1D transform includes a variance stabilizing transform configured to process data that follows a signal-dependent noise distribution and the signal-dependent noise distribution includes a Poisson distribution and wherein the generating of the first filtered image comprises:
applying an inverse of the 1D transform to the first plurality of transformed 3D stacks comprising the modified 1D transform-domain coefficients to obtain a corresponding first plurality of filtered 3D stacks of image blocks; and
aggregating the image blocks comprised in the first plurality of filtered 3D stacks into the first filtered image; and
wherein the generating of the second filtered image comprises:
applying the inverse of the 1D transform to the third plurality of transformed 3D stacks comprising the modified 1D transform-domain coefficients to obtain a corresponding second plurality of filtered 3D stacks of image blocks; and
aggregating the image blocks comprised in the second plurality of filtered 3D stacks into the second filtered image; and
wherein the operations further comprise at least one of the following sets of operations:
convolution and deconvolution operations to perform image deblurring;
downsampling and upsampling operations to perform image super-resolution;
masking and interpolation operations to perform image inpainting; and
forward and backward operations to perform inverse imaging.

* * * * *